United States Patent [19]

Birsching

[11] Patent Number: 5,454,439
[45] Date of Patent: Oct. 3, 1995

[54] POWER STEERING GEAR FOR MOTOR VEHICLE

[75] Inventor: Joel E. Birsching, Unionville, Mich.

[73] Assignee: General Motors Corporation, Detroit, Mich.

[21] Appl. No.: 297,442

[22] Filed: Aug. 29, 1994

[51] Int. Cl.$^6$ .............................. B62D 5/04; B62D 5/083
[52] U.S. Cl. ................ 180/79.1; 180/132; 180/142; 192/84 PM; 310/115; 310/116
[58] Field of Search ........................ 180/132, 142, 180/79.1; 192/84 PM; 310/266, 158, 115, 116

[56] References Cited

U.S. PATENT DOCUMENTS

| | | | |
|---|---|---|---|
| 4,871,040 | 10/1989 | Zuraski et al. | 180/142 |
| 4,886,137 | 12/1989 | Pawlak et al. | 180/142 |
| 4,886,138 | 12/1989 | Graber et al. | 180/142 |
| 5,038,063 | 8/1991 | Graber et al. | 310/115 |
| 5,038,066 | 8/1991 | Pawlak et al. | 310/263 |
| 5,070,956 | 12/1991 | Pawlak et al. | 180/141 |
| 5,119,898 | 6/1992 | Eckhardt et al. | 180/142 |

OTHER PUBLICATIONS

Paper on Rotary Actuators by Andrzej M. Pawlak; Steve Schultz and Vineeta Gangla.

*Primary Examiner*—Mitchell J. Hill
*Attorney, Agent, or Firm*—Saul Schwartz

[57] ABSTRACT

A motor vehicle power steering gear having a proportional control valve and an electromagnetic apparatus for varying the effective restoring torque of a torsion bar of the proportional control valve. The electromagnetic apparatus includes a cylindrical ring attached to a valve spool of the proportional control valve having "n" permanent magnets thereon with alternating radial polarity, a pole piece rigidly attached to a valve body of the proportional control valve having n/2 homopolar outer pole teeth outside of the magnet ring and n/2 homopolar inner pole teeth inside of the magnet ring in radial alignment with the outer pole teeth, and a stationary exciting coil magnetically coupled to the pole teeth. The pole teeth are grouped in n/4 symmetrically arrayed pairs. A first angle between radial centerlines of the permanent magnets is 360/n. A second angle between radial centerlines of the pole teeth in each pair is greater than the first angle (360/n) and less than two times the first angle (2(360/n)).

2 Claims, 5 Drawing Sheets

5,454,439

POWER STEERING GEAR FOR MOTOR VEHICLE

FIELD OF THE INVENTION

This invention relates to variable effort power steering gears for motor vehicles.

BACKGROUND OF THE INVENTION

U.S. Pat. Nos. 4,454,801 and 3,022,772, issued 19 Jun. 1984 and 27 Feb. 1962, respectively, and assigned to the assignee of this invention, describe a proportional control valve in motor vehicle power steering gear including a valve spool connected to a manual steering wheel, a valve body connected to steered wheels of the vehicle, and a torsion bar between the valve spool and valve body defining a center position of the former relative to the latter. A plurality of throttling orifices of the control valve defined between the valve body and the valve spool regulate a steering assist boost pressure when the valve spool is rotated relative to the valve body from the center position by manual effort at the steering wheel. Rotation of the valve spool relative to the valve body induces a restoring or centering torque in the torsion bar which is perceived by a driver as the manual effort necessary to steer the vehicle.

U.S. Pat. No. 5,119,898, issued 9 Jun. 1992 and assigned to the assignee of this invention, describes a power steering gear having a proportional control valve as described above and an electromagnetic apparatus for varying the effective centering torque of the torsion bar. The electromagnetic apparatus includes a cylindrical ring attached to the valve spool having a plurality of radial permanent magnets thereon, a pole piece attached to the valve body having a plurality of outer pole teeth outside of the magnet ring and a plurality of inner pole teeth inside of the magnet ring, and a stationary exciting coil magnetically coupled to the pole teeth. An electromagnetic torque is induced between the pole piece and the permanent magnet ring which either increases or decreases the effective centering torque of the torsion bar depending upon the direction of current flow in the exciting coil. A motor vehicle power steering gear according to this invention is an improvement relative to the power steering gear described in the aforesaid U.S. Pat. No. 5,119,898.

SUMMARY OF THE INVENTION

This invention is a new and improved motor vehicle power steering gear having a proportional control valve and an electromagnetic apparatus for varying the effective centering torque of a torsion bar of the proportional control valve. The torsion bar establishes a center position of a valve spool of the proportional control valve relative to a valve body of the latter. The electromagnetic apparatus includes a cylindrical ring attached to the valve spool having "n" radial permanent magnets thereon, a pole piece rigidly attached to the valve body having n/2 homopolar outer pole teeth outside of the magnet ring and n/2 homopolar inner pole teeth inside of the magnet ring in radial alignment with the outer pole teeth, and a stationary exciting coil magnetically coupled to the pole teeth. The radial centerlines of the permanent magnets are evenly spaced around the circumference of the magnet ring and separated by 360/n degrees. The pole teeth are grouped in n/4 symmetrically arrayed pairs. The angular separation between the radial centerlines of the pole teeth in each pair is less than 2×(360/n) degrees so that in a null position of the permanent magnet assembly relative to the pole piece, the net force reactions between the outer pole teeth and the magnet ring attributable to permanent magnet and to electromagnetic flux interaction are in static equilibrium and the net force reactions between the inner pole teeth and magnet ring attributable to permanent magnet and to electromagnetic flux interaction are also in static equilibrium. With each of the inner and outer net force reactions always in static equilibrium, dimensional variations from one steering gear to another, such as in air gap dimensions between the pole teeth and the magnet ring, within a manufacturing tolerance range do not alter the performance characteristics of the steering gear.

DESCRIPTION OF A PREFERRED EMBODIMENT

Figure 1:
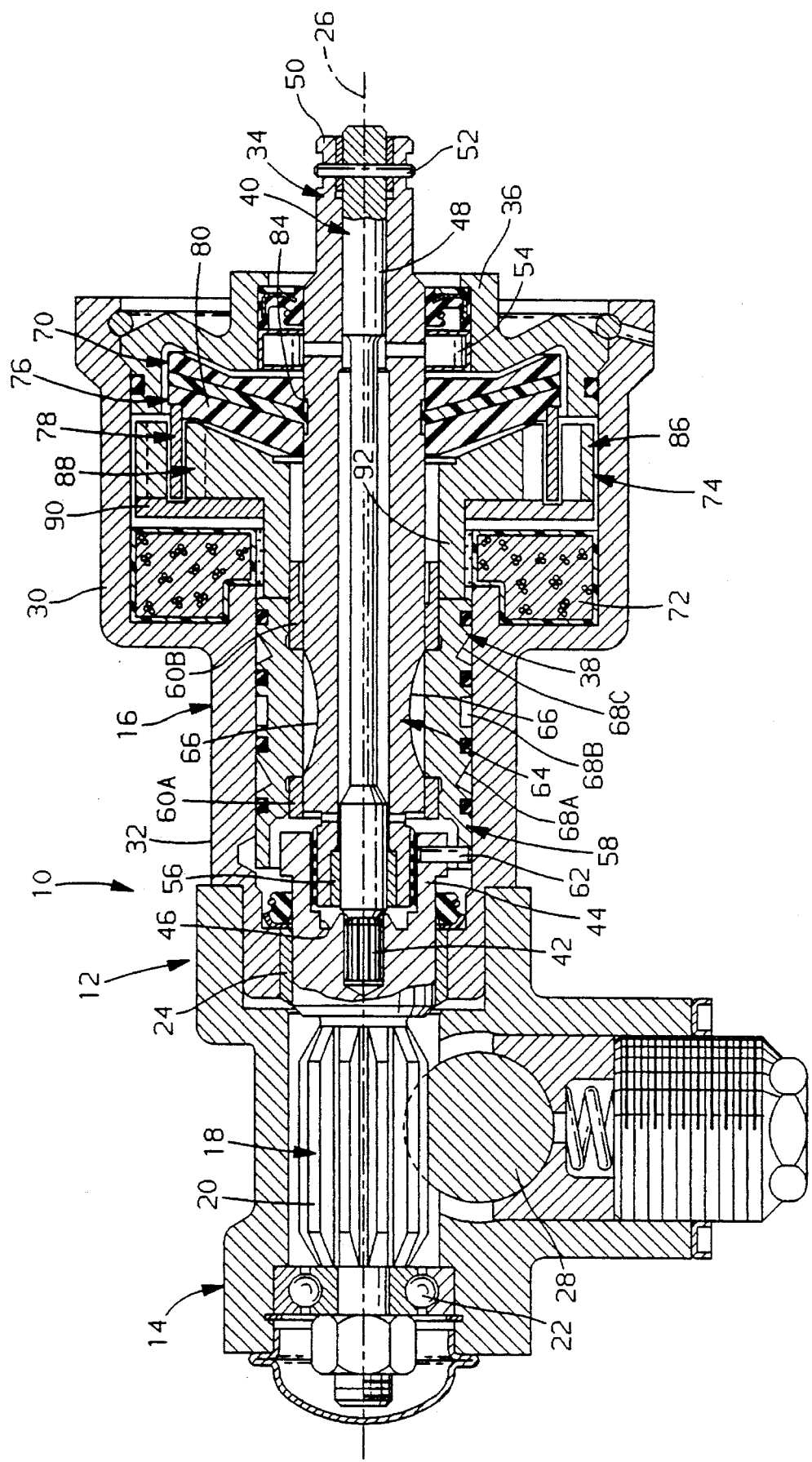
FIG. 1 is a sectional view of a motor vehicle power steering gear according to this invention taken along a longitudinal centerplane thereof.

Referring to FIG. 1, a motor vehicle power steering gear 10 according to this invention is generally as described in the aforesaid U.S. Pat. No. 5,119,898 and includes a composite housing 12 consisting of a rack housing 14 and a valve housing 16. A pinion head 18 having a plurality of gear teeth 20 thereon is supported on the rack housing 14 by a ball bearing 22 and by a sleeve bearing 24 for rotation about a centerline 26 of the composite housing 12. A rack bar 28, having a plurality of rack teeth meshing with the gear teeth 20 on the pinion head, is supported on the rack housing 14 for bodily movement perpendicular to the centerline 26 in response to rotation of the pinion head. The ends of the rack bar, not shown, are connected to steerable wheels of the motor vehicle in conventional fashion.

The valve housing 16 has a large diameter part 30 and a small diameter part 32. A tubular input or stub shaft 34 of the steering gear protrudes into the valve housing 16 through a cover 36 at an open end of the large diameter part 30. A proportional control valve 38 of the steering gear 10, like the proportional control valves described in the aforesaid U.S. Pat. Nos. 4,454,801 and 3,022,772, is disposed inside of the small diameter part 32 of the valve housing and includes a torsion bar 40 inside the stub shaft 34. The torsion bar has an inboard end 42 protruding beyond a corresponding inboard end 44 of the stub shaft force fitted in a serrated bore inside a counterbore 46 in the pinion head 18. The torsion bar 40 has an outboard end 48 rigidly connected to the stub shaft 34 at an outboard end 50 of the latter by a pin 52.

The outboard end 50 of the stub shaft is connected to a manual steering wheel, not shown, of the motor vehicle for rotation as a unit therewith. The stub shaft is supported on the composite housing 12 for rotation about the centerline 26 independent of the pinion head by a roller bearing 54 on the cover 36 and by a sleeve bearing 56 between the torsion bar and the stub shaft. A lost motion connection in the counterbore 46 permits about 14 degrees of relative angular movement between the pinion head and the stub shaft.

A tubular valve body 58 of the proportional control valve is supported on the stub shaft 34 for rotation about the centerline 26 independent of the stub shaft by a pair of bushing rings 60A–B press fitted in counterbores in the ends of the valve body. The valve body is connected by a pin 62 to the pinion head for rotation as a unit therewith. A valve spool 64 of the proportional control valve 38 is defined on the part of the stub shaft 34 inside the valve body 58 and includes a plurality of arc-shaped slots 66 facing a plurality of internal grooves, not shown, in the valve body and cooperating therewith in defining a plurality of variable area throttling orifices. A plurality of outside annular grooves 68A–C on the valve body 58 are isolated from each other by seal rings slidably engaging the wall of the small diameter part 32 of the valve housing. The grooves 68A, 68C are connected to opposite working chambers, not shown, of a steering assist fluid motor. The groove 68B is connected to a pump, not shown.

The torsion bar defines a center position of the valve spool relative to the valve body in which all of the throttling orifices are equally open and fluid circulates freely from the groove 68B to a drain, not shown, connected to a reservoir. When the valve spool is rotated relative to the valve body by manual effort applied at the steering wheel, one half of the throttling orifices become smaller and regulate a steering assist boost pressure in a corresponding one of the grooves 68A, 68C and one half of the throttling orifices become larger for unobstructed drainage of fluid from the other of the grooves 68A, 68C to the reservoir. The flow area of the smaller throttling orifices is proportional to the amount of twist between the outboard end 48 of the torsion bar and the inboard end 42 thereof. The centering torque of the torsion bar 40 resisting such twist is the manual effort necessary to steer the vehicle perceived by the operator at the steering wheel.

An electromagnetic apparatus 70 of the steering gear 10 varies the effective centering torque of the torsion bar to change the level of steering assist, i.e. steering assist boost pressure, achieved for a given manual steering input applied at the steering wheel of the motor vehicle. The electromagnetic apparatus 70 includes a stationary exciting coil 72 at the inboard end of the large diameter part 30 of the valve housing 16, a pole piece 74, and a permanent magnet assembly 76, FIG. 1.

The permanent magnet assembly 76 includes a cylindrical ring 78 and a plastic retaining hub 80, FIG. 1, on the stub shaft. The ring 78 is made of sintered powdered metal magnetized to define an even number "n" of radially oriented permanent magnets 82 the polarity of which alternate around the ring, FIG. 4. An end of the magnet ring 78 is rigidly attached to the retaining hub whereby the magnet ring is supported on the stub shaft symmetrically around the centerline 26. The hub 80 and the magnet ring 78 are connected to the stub shaft 34 for rotation as a unit with the stub shaft and the valve spool 64 around the centerline 26 by a plastic ring 84 which is in situ injection molded through a bore in the web of the retaining hub.

Figure 2:
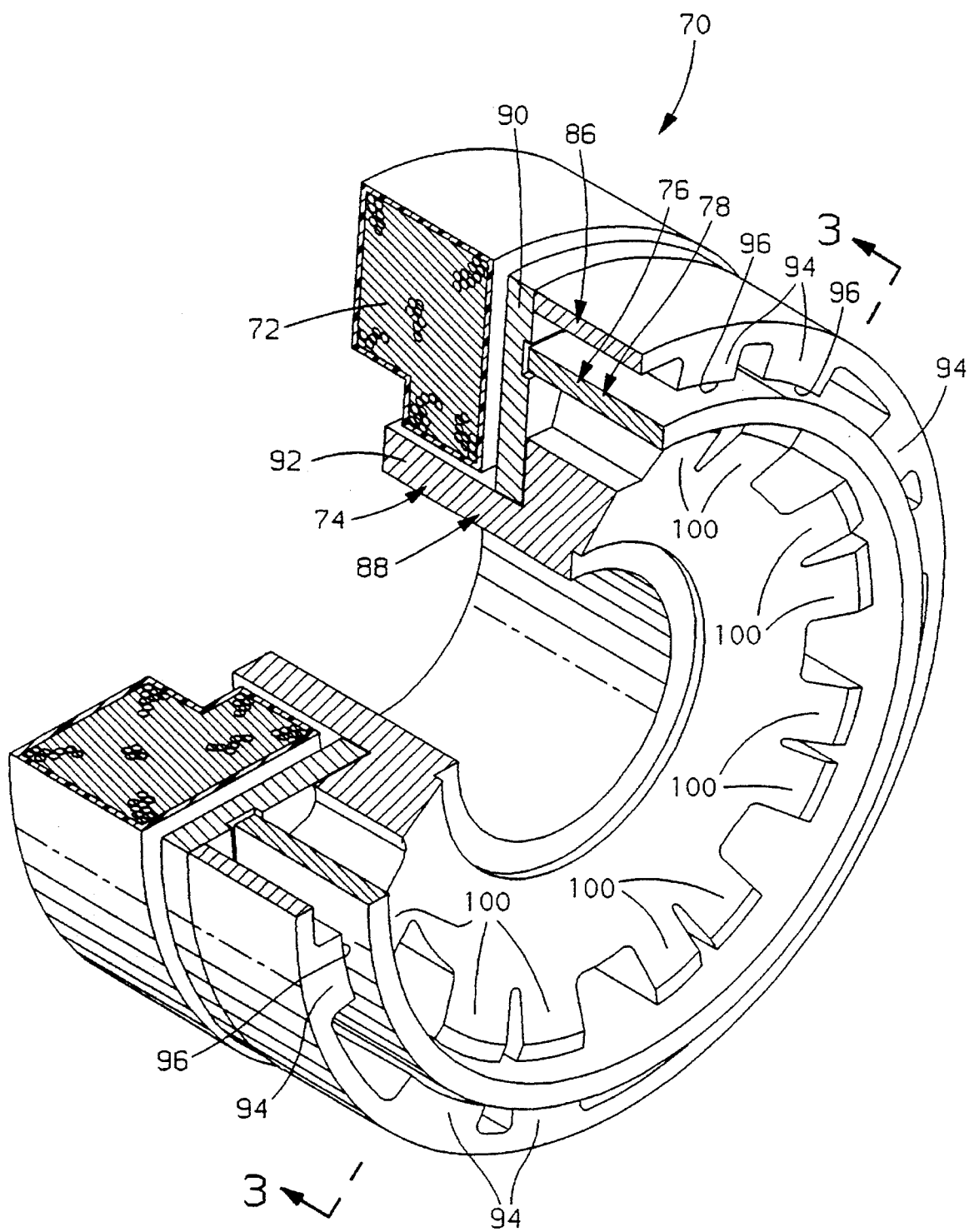
FIG. 2 is a partially broken-away perspective view of a portion of FIG. 1.
Figure 3:
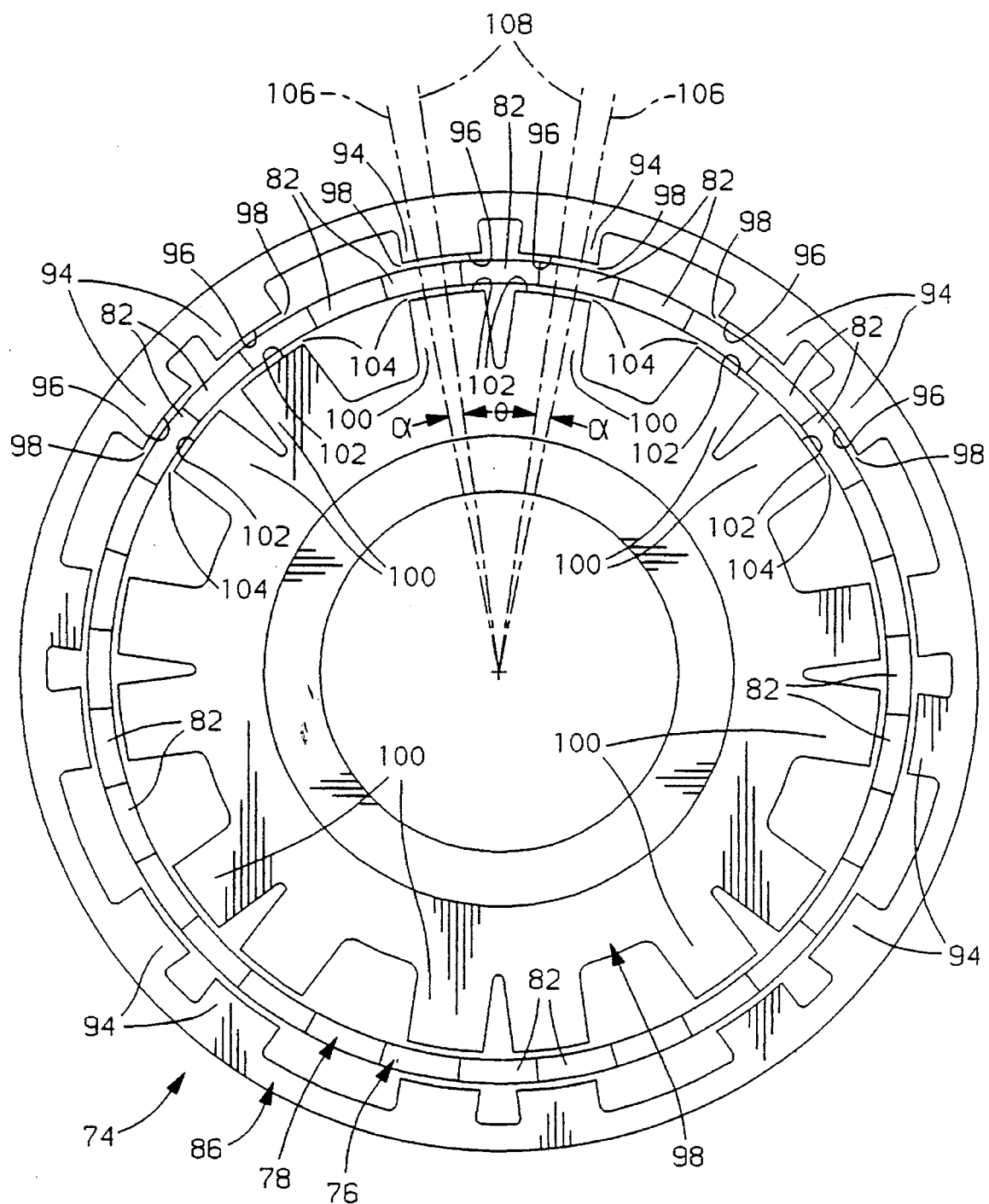
FIG. 3 is a sectional view taken generally along the plane indicated by lines 3—3 in FIG. 2.
Figure 4:
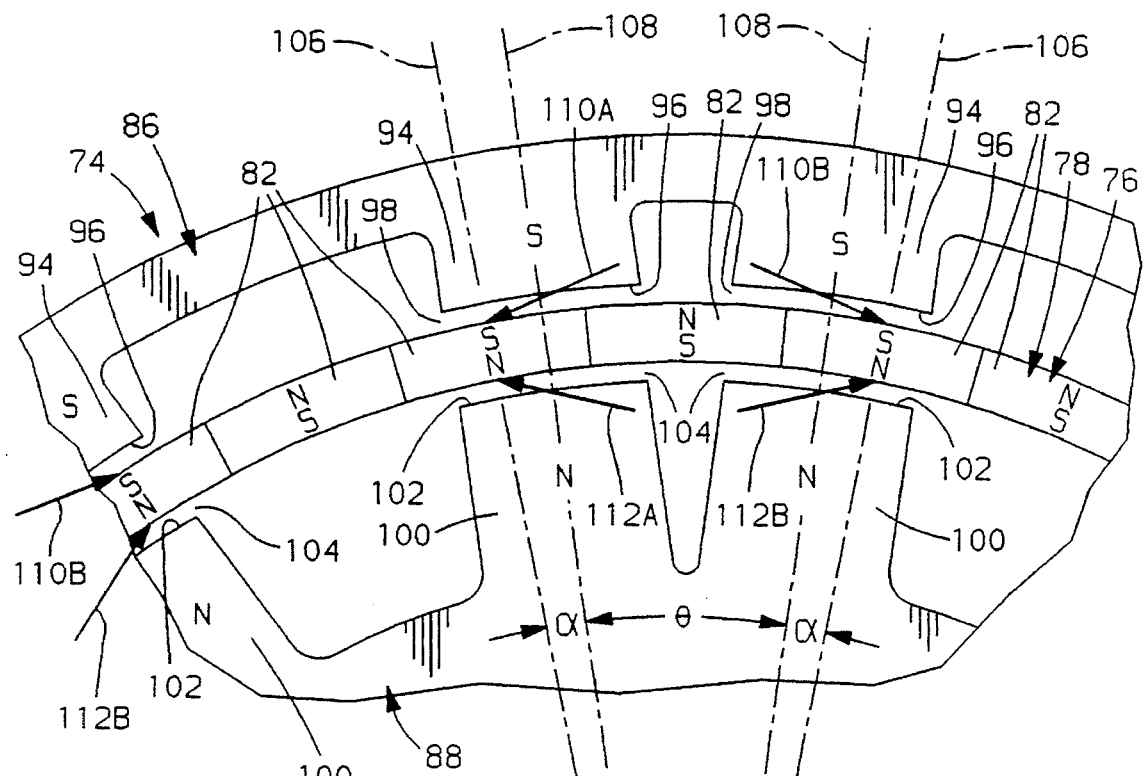
FIG. 4 is an enlarged view of a portion of FIG. 3.

As seen best in FIGS. 2–4, the pole piece 74 includes a cylindrical, magnetic flux conducting outer ring 86 radially outside or outboard of the magnet ring 78 and a cylindrical, magnetic flux conducting inner ring 88 radially inside or inboard of the magnet ring. The inner and outer rings 88, 86 are rigidly interconnected by an annular, non-ferromagnetic flat plate 90 in a plane perpendicular to the centerline 26. The inner ring 88 has a tubular skirt 92 inside of the exciting coil 72 which is press fitted on an extension of the bushing ring 60B whereby the pole piece 74 is rotatable as a unit with the valve body 58 and the pinion head around the centerline 26 relative to the stub shaft 34 and the valve spool 64.

As seen best in FIGS. 3–4, the outer ring 86 has n/2 integral outer pole teeth 94 extending radially inward toward the magnet ring 78. Each outer pole tooth has an inboard end 96 separated from the magnet ring 78 by an outer air gap 98 having a predetermined radial air gap dimension. Similarly, the inner ring 88 has n/2 integral inner pole teeth 100 extending radially outward toward the magnet ring 78 in radial alignment with respective ones of the outer pole teeth. Each inner pole tooth has an outboard end 102 separated from the magnet ring 78 by an inner air gap 104 having a predetermined radial air gap dimension. The radial air gap dimensions of the inner and outer air gaps 104, 98 are exaggerated in FIGS. 3–4 for clarity.

Referring again to FIGS. 3–4, the permanent magnets 82 are evenly or symmetrically arrayed around the circumference of the magnet ring 78 so that the angular interval between a radial centerline 106 of each of the magnets is 360/n degrees. The inner and outer pole teeth 100, 94 are grouped in n/4 pairs which are symmetrically arrayed around the magnet ring 78. Each of the radially aligned pairs of pole teeth 94, 100 has a radial centerline 108. An angle $\phi$ between the centerlines 108 of the pole teeth in each pair is greater than 360/n and less than two times 360/n, i.e. $360/n < \phi < 2(360/n)$. The angle $\phi$ is preferably in a range of between 3 degrees and 6 degrees smaller than 2(360/n).

With no electric current in the exciting coil 72, magnetic interaction between the permanent magnets 82 and the pole teeth 94, 100 due solely to the permanent magnets defines a neutral or null position of the pole piece 74 relative to the permanent magnet assembly 76, FIG. 3, in which the radial centerlines 106 of alternate ones of the permanent magnets 82, i.e. the permanent magnets having the same radial polar orientation, are separated from the centerlines 108 of the corresponding aligned pairs of inner and outer pole teeth by angles $\alpha$, each equal to $\frac{1}{2}(2(360/n) - \phi)$. In the null position, net force reactions between the magnet ring and the outer pole teeth are in static equilibrium and net force reactions between the magnet ring and the inner pole teeth are also in static equilibrium so that the net torque reaction between the permanent magnet assembly 76 and the pole piece 74 due to the permanent magnets 82 is zero.

For optimum steering gear performance, the null position of the pole piece 74 relative to the permanent magnet assembly 76 must coincide with the aforesaid center position of the valve spool 64 relative to the valve body 58. To achieve such coincidence, the proportional control valve 38 is first assembled in the composite housing 12 with the center position of the valve spool 64 relative to the valve body 58 captured by drilling holes for and inserting the pin 52 in the torsion bar and the stub shaft after the proportional control valve is hydraulically balanced. The permanent magnet assembly 76 is then rotated on the stub shaft to the aforesaid null position. Finally, the plastic ring 84 is in situ injection molded between the retaining hub 80 and the stub shaft 34 to capture the position of the permanent magnet assembly relative to the pole piece.

The outer pole teeth 94 are magnetically coupled to the exciting coil 72 by the wall of the large diameter part 30 of the valve housing 16. The inner pole teeth 100 are magnetically coupled to the exciting coil by the tubular skirt 92 and by the valve body 58. When electric current flows in the exciting coil, the homopolar inner pole teeth 100 assume opposite polarity from the homopolar outer pole teeth 94 depending upon the direction of current flow. Electromagnetic flux concentrated by the inner and outer pole teeth traverses the inner and outer air gaps 104, 98 and interacts with the permanent magnetic flux of the permanent magnets 82 to either attract or repel the permanent magnets.

When, for example, current flow in the exciting coil 72 induces like polarity between the outer pole teeth 94 and the radial outer poles of the adjacent permanent magnets 82 and between the inner pole teeth 100 and the inner poles of the adjacent permanent magnets, FIG. 4, a plurality (n/4) of pairs of equal and opposite outer resultant force vectors 110A–B and inner resultant force vectors 112A–B are induced on the magnet ring 78. The net torque reaction on the permanent magnet ring 78 at the null position thereof relative to the permanent magnet assembly, attributable to electromagnetic flux induced by the exciting coil 72 is, therefore, zero.

In that circumstance, when a driver turns the steering wheel in either direction, the stub shaft 34 and the permanent magnet assembly 76 rotate relative to the valve body 58 and the pole piece 74 from the null position. Relative rotation between the permanent magnets 82 and the inner and outer pole teeth 100, 94 effects changes in the magnitude and direction of the resultant force vectors 110A–B, 112A–B such that a net electromagnetic torque is induced on the permanent magnet assembly which resists rotation thereof relative to the pole piece 74. The effective restoring torque of the torsion bar 40 is thus increased so that the driver must apply more manual effort at the steering wheel, regardless of which direction the steering wheel is being turned, to achieve the same boost pressure, i.e. steering assist, which otherwise would have been achieved at less manual effort corresponding to the restoring torque of the torsion bar alone.

Conversely, when the direction of current flow in the exciting coil is reversed, the polarity of the homopolar inner and the outer pole teeth 100, 94 likewise reverses so that an opposite net electromagnetic torque is induced on the permanent magnet ring when the driver turns the steering wheel which supplements the manual effort of the driver applied at the steering wheel. The effective restoring torque of the torsion bar 40 is thus decreased and the driver must apply less manual effort at the steering wheel, regardless of which direction the steering wheel is being turned, to achieve the same boost pressure, i.e. steering assist, which otherwise would have been achieved at greater manual effort corresponding to the restoring torque of the torsion bar alone.

Achievement of static balance between the outer pole teeth and the magnet ring and between the inner pole teeth and the magnet ring in the null position of the latter relative to the former is an important feature of this invention. For example, dimensional tolerance ranges characteristic of high volume production methods may result in the magnitudes of the inner and outer air gap dimensions being relatively larger or smaller from one steering gear to another. The relative magnitudes of the air gap dimensions effect the magnitudes of the resultant force vectors 110A–B, 112A–B. However, in the steering gear 10 according to this invention, when all the inner air gap dimensions and/or all of the outer air gap dimensions change by the same amount, the magnitudes of the equal and opposite resultant force vectors 110A–B and/or force vectors 112A–B likewise change by the same amount so that static equilibrium at the null position is maintained.

Figure 6:
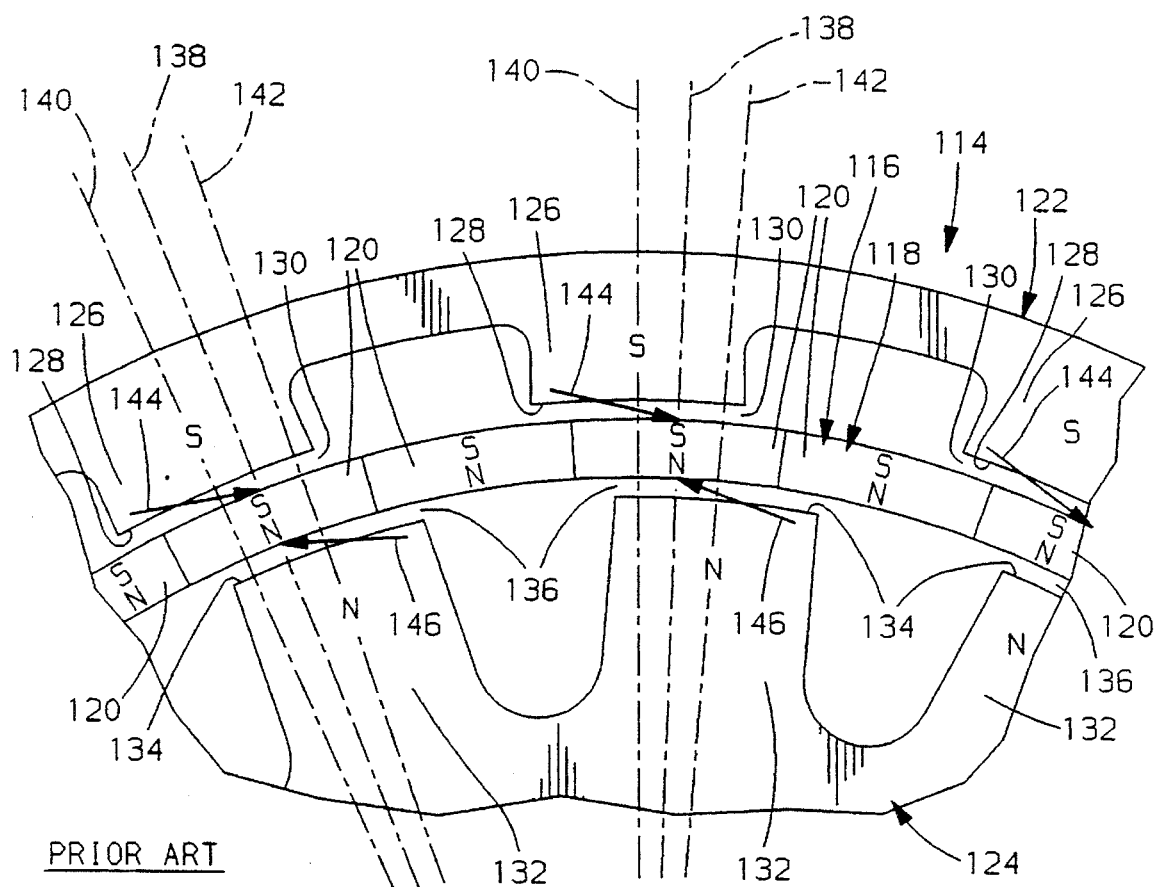
FIG. 6 is an enlarged view of a portion of FIG. 5.
Figure 5:
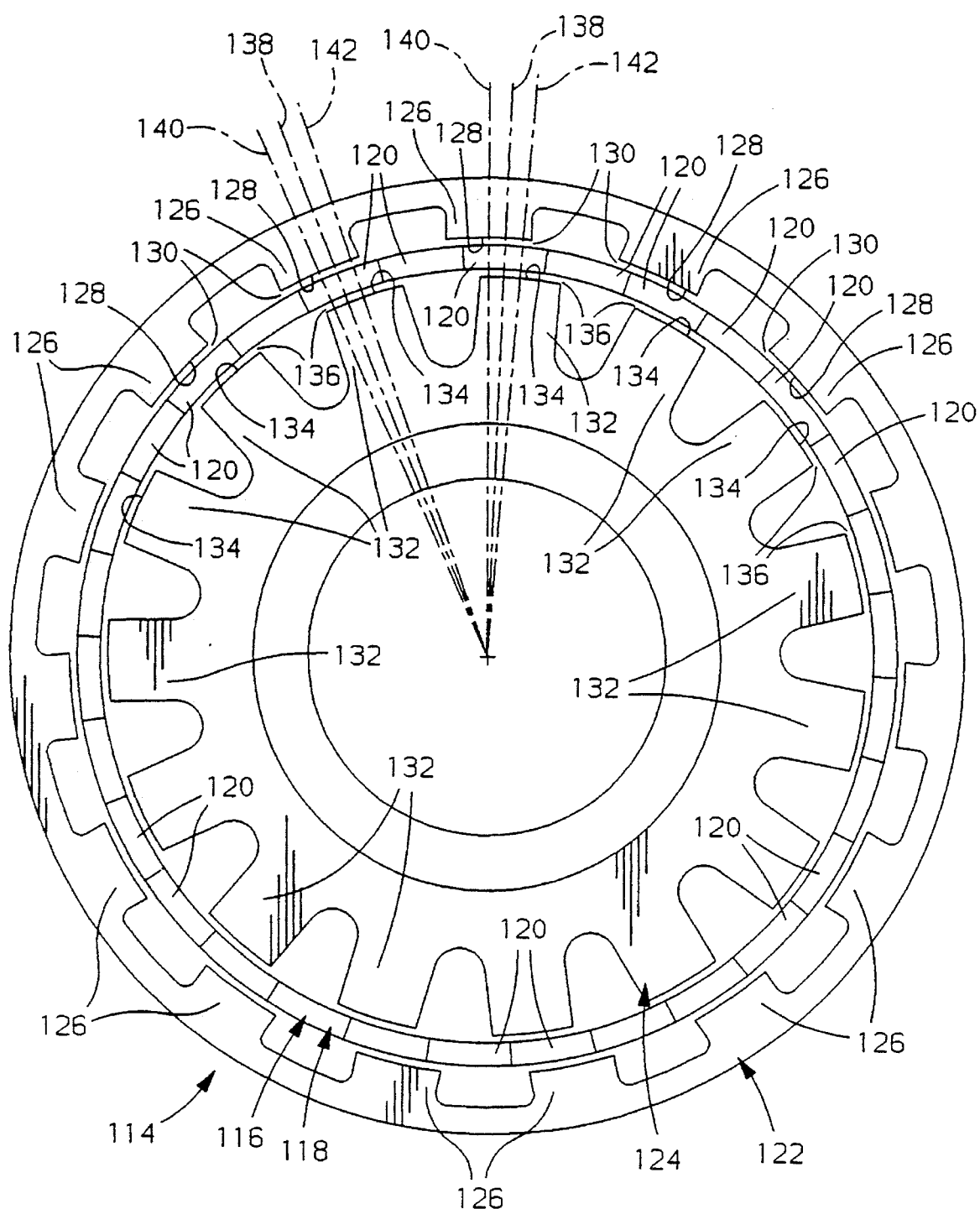
FIG. 5 is similar to FIG. 3 showing corresponding structure of a prior motor vehicle power steering gear.

This aspect of the operation of the steering gear 10 according to this invention is contrasted with the operation of a prior motor vehicle power steering gear, not shown, identical to the steering gear 10 except as follows. Referring to FIGS. 5–6, the prior steering gear includes a pole piece 114 and a permanent magnet assembly 116. The permanent magnet assembly includes a magnet ring 118 corresponding to the magnet ring 78 in the steering gear 10 according to this invention and, likewise, having "n" radially oriented permanent magnets 120 thereon. The pole piece 114 includes a cylindrical, magnetic flux conducting outer ring 122 radially outside of the magnet ring 118 and a cylindrical, magnetic flux conducting inner ring 124 radially inside of the magnet ring 118.

The outer ring 122 has n/2 outer pole teeth 126 thereon evenly arrayed around the circumference thereof and extending radially inward toward the magnet ring 118. Each outer pole tooth 126 has an inboard end 128 separated from the magnet ring 118 by an outer air gap 130. The inner ring 124 has n/2 inner pole teeth 132 thereon evenly arrayed around the circumference thereof and extending radially outward toward the magnet ring 118. Each inner pole tooth 132 has an outboard end 134 separated from the magnet ring by an inner air gap 136.

In a null position of the magnet ring 118 relative to the pole piece 114 due only to the permanent magnets 120, a radial centerline 138 of each of the permanent magnets 120 having the same radial polarity, i.e. alternate ones of the permanent magnets, is flanked on one side by a radial centerline 140 of the corresponding outer pole tooth 126 and on the other side by a radial centerline 142 of the corresponding inner pole tooth 132. When electric current flows in the exciting coil such that the electromagnetic polarity of the homopolar inner and outer pole teeth 132, 126 matches the polarity of the adjacent permanent magnets, a plurality of unidirectional outer net reaction force vectors 144 and a plurality of unidirectional inner net reaction force vectors 146, FIG. 6, are induced on the magnet ring 118. The relative magnitudes of the air gap dimensions of the inner and outer air gaps 136, 130 are closely controlled and intentionally unequal so that the net electromagnetic torque reaction on the permanent magnet ring 118 in the null position thereof relative to the pole piece 114 is zero. The same condition obtains when the direction of current flow in the exciting coil and the corresponding directions of the net reaction force vectors 144, 146 are reversed.

If, however, the outer air gap dimensions change relative to the inner air gap dimensions due, for example, to manufacturing tolerances, the magnitudes of the outer net reaction force vectors 144 will change relative to the magnitudes of the inner net reaction force vectors 146. In that circumstance, a net torque reaction between the pole piece 114 and the magnet ring 118 may exist which could induce relative rotation between the two to an actual null position angularly displaced from the design or intended null position. Manufacturing costs associated with precisely maintaining the inner and outer air gap dimensions to avoid that circumstance are, therefore, relatively high.

The embodiments of the invention in which an exclusive property or privilege is claimed are defined as follows:

1. In a motor vehicle power steering gear having
a proportional control valve including
a valve spool connected to a steered wheel of the vehicle,
a valve body connected to a manual steering wheel of the vehicle, and
a torsion bar having a first end connected to the steered wheels of the vehicle and a second end connected to the manual steering wheel of the vehicle defining a center position of the valve spool relative to the valve body and resisting relative rotation therebetween with a restoring torque proportional to the amount of twist of the torsion bar caused by manual effort applied at the manual steering wheel of the vehicle, and an electromagnetic apparatus for varying the magnitude of the effective restoring torque of the torsion bar including a stationary exciting coil, a permanent magnet assembly including a cylindrical magnet ring connected to the valve spool for rotation as a unit therewith having a plurality (n) of permanent magnets thereon of alternating radial polarity each having a radial centerline separated by a first angle (360/n degrees) from the centerlines of adjacent ones of the permanent magnets, and a pole piece connected to the valve body for rotation as a unit therewith and magnetically coupled to the exciting coil having a magnetic flux conducting outer ring radially outboard of the magnet ring and a magnetic flux conducting inner ring radially inboard of the magnet ring, the improvement comprising:

means defining a plurality (n/2) of outer pole teeth on the outer ring extending radially inward toward the magnet ring arrayed symmetrically around the outer ring in a plurality (n/4) of pairs each of which pairs is characterized by a second angle between a radial centerline of each of the outer pole teeth in the pair greater than the first angle (360/n) and less than two times the first angle (2(360/n)), and means defining a plurality (n/2) of inner pole teeth on the inner ring extending radially outward toward the magnet ring arrayed symmetrically around the outer ring in a plurality (n/4) of pairs and with a radial centerline of each coinciding with the radial centerlines of respective ones of the outer pole teeth so that each of the inner pole teeth is in radial alignment with a corresponding one of the outer pole teeth.

2. The motor vehicle power steering gear recited in claim 1 wherein, the difference between two times the first angle (2(360/n)) and the second angle is in a range of between 3 degrees and 6 degrees.

* * * * *